UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PROCESS OF FERTILIZING.

1,200,806.      Specification of Letters Patent.     Patented Oct. 10, 1916.

No Drawing.      Application filed September 4, 1914. Serial No. 860,165.

*To all whom it may concern:*

Be it known that I, CARL BOSCH, citizen of the German Empire, residing at Ludwigshafen-on-the-Rhine, Germany, have invented new and useful Improvements in Processes of Fertilizing, of which the following is a specification.

I have discovered that fertilizers containing as an essential constituent urea nitrate are excellently suited for supplying nitrogen to crops, since it is easily taken up and assimilated by the plants. The employment of urea nitrate as a fertilizer also possesses the advantage that no unnecessary or harmful ballast is added to the soil as is the case when ammonium sulfate, or Chile saltpeter is employed, in which cases the sulfuric acid and the soda respectively are not, at any rate entirely, taken up by the plants.

Urea nitrate exercises a better fertilizing action than does urea, and is particularly suited for fertilizing tobacco plants, which yield a tobacco particularly free from obnoxious ash and from spots or similar marks on the dried leaves.

Now what I claim is:—

1. The process of fertilizing crops by treating them with urea nitrate.

2. The process of fertilizing tobacco plants by treating them with urea nitrate.

3. The step in the manufacture of tobacco particularly free from obnoxious ash constituents and from marks on the dried leaves, which consists in supplying the nitrogenous manure to the plants in the form of urea nitrate.

In testimony whereof I have hereunto set my hand in the presence of two subscribing witnesses.

CARL BOSCH.

Witnesses:
   J. ALEC. LLOYD,
   ANDREW HEER.